United States Patent [19]

Britton

[11] 4,454,184

[45] Jun. 12, 1984

[54] SHEET MATERIAL COMPRISING LAYERS OF ALIGNED STRANDS COMPLETELY SURROUNDED BY ADHESIVE

[76] Inventor: Arthur Britton, 4 The Sycamores, Bramhope, Leeds, LS16 9JR Yorkshire, England

[21] Appl. No.: 356,649

[22] Filed: Mar. 9, 1982

Related U.S. Application Data

[63] Continuation of Ser. No. 145,809, May 1, 1980, abandoned.

[30] Foreign Application Priority Data

May 5, 1979 [GB] United Kingdom ............. 7915750

[51] Int. Cl.³ ............................................. B32B 5/12
[52] U.S. Cl. ............................... 428/110; 428/105; 428/114; 428/224; 428/294; 428/295; 428/297
[58] Field of Search ............ 428/107, 105, 108, 109, 428/110, 112, 113, 114, 198, 294, 297, 224, 295

[56] References Cited

U.S. PATENT DOCUMENTS

| | | | |
|---|---|---|---|
| 885,219 | 4/1908 | Bayne et al. | 156/148 |
| 2,919,217 | 12/1959 | Bobkowicz | 428/114 |
| 3,276,942 | 10/1966 | Ewing | 428/114 |
| 3,490,983 | 1/1970 | Lee | 428/294 |
| 3,756,905 | 9/1973 | Mills et al. | 428/114 |
| 3,784,441 | 1/1974 | Kaempen | 428/112 |
| 4,374,170 | 2/1983 | Fesko | 428/288 |

FOREIGN PATENT DOCUMENTS 1240608 5/1967 Fed. Rep. of Germany ...... 156/181

Primary Examiner—James J. Bell
Attorney, Agent, or Firm—Fleit, Jacobson, Cohn & Price

[57] ABSTRACT

A sheet material comprises at least three superposed layers (11, 12, 13, 14) each consisting of a plurality of strands (11a, 12a, 13a, 14a) disposed in and completely surrounded by a mass of adhesive so that individual strands of each layer adhere to one another and adjacent layers adhere to each other. Strands in adjacent layers are transversely, and preferably perpendicularly, arranged. A preferred adhesive is curable polyvinyl chloride. Strands in non-adjacent layers may be substantially aligned or may be offset. Strands may have a non uniform or uniform spacing and may be of the same or differing decitex. Material is made by embedding strands in adhesive, placing layers so formed together and thereafter curing the adhesive. The material has greater tear strength in at least one direction than conventional plastics coated woven material having the same yarn content.

15 Claims, 8 Drawing Figures

SHEET MATERIAL COMPRISING LAYERS OF ALIGNED STRANDS COMPLETELY SURROUNDED BY ADHESIVE

This is a continuation of application Ser. No. 145,809 filed May 1, 1980, now abandoned.

This invention relates to sheet material.

The invention is particularly, but not exclusively, concerned with so-called "tarpaulins", which are much used for covering loads on lorries, and similar sheets which are subjected to rough handling or which have to withstand substantial stresses in use, or both, such as boat-sails, and fabrics for inflatable structures.

During recent years it has been common practice to make tarpaulins by coating a simply-woven textile fabric with a plastics material.

For example one medium grade tarpaulin is normally based on a simply-woven fabric constructed from I.C.I. nylon type 126,980 decitex, untwisted continuous filament yarn, 8.27 ends per centimeter and 8.27 picks per centimeter, and weighing approximately 170 grams per square meter. To this fabric is applied about between 400–500 and preferably 450 grams per square meter of a suitable polyvinyl chloride in a multi-stage process which includes gelation in an oven, sometimes with simultaneous embossing.

If, instead of weaving the base fabric, two sets of yarn ends are simply cross-laid, the result, in terms of tear strength in particular, is entirely unsatisfactory, and for this reason cross laying as a technique for making a tarpaulin base fabric has not been persued.

However, I have discovered that the use of a multiply crosslaid base fabric has surprising advantages over conventional fabrics even though it contains the same mass of yarn provided, according to the present invention, three at least, and preferably four, superposed non-woven layers of strands, the strands in each layer being transverse to the strands in the adjacent layer or layers, are used to form the base fabric of a tarpaulin. The principal such advantages are a significant improvement in the tear strength, and a significant reduction in the incidence of porosity due to abrasion, compared with a conventional tarpaulin having substantially the same amount of strand material, and coating material.

According to one aspect of the present invention, there is provided a sheet material comprising a first layer having a plurality of aligned strands disposed in and completely surrounded by a mass of an adhesive; a second layer having a plurality of aligned strands disposed in and completely surrounded by a mass of an adhesive, superposed on the first layer with its strands lying transverse to the strands of the first layer and a third layer having a plurality of aligned strands disposed in and completely surrounded by a mass of an adhesive with the strands disposed transversely to the strands in the second layer whereby to produce, for a given weight per unit area of material, a material of greater tear strength in at least one direction than a synthetic plastics material coated textile material woven from strands of the same material.

Preferably the strands in each layer are parallel and preferably the strands in a layer are orthogonal to the strands in the adjacent layer or layers.

The strands may be of spun fibres, continuous filaments of a mixture of these.

According to another aspect of the present invention, there is provided a method of producing a sheet material including the steps of applying an adhesive to a web comprising a plurality of strands extending substantially in the same direction, indexing the web forward in a series of timed steps and applying thereto in synchronism with the indexing movement a series of severed lengths from a similarly produced web so that these lengths lie in side by side relationship transversely across the first mentioned web and applying a third, similarly produced, web on top of the severed lengths.

The invention may be performed in various ways and some specific embodiments will now be described by way of example with reference to the accompanying diagrammatic drawings, in which.

Figure 1:
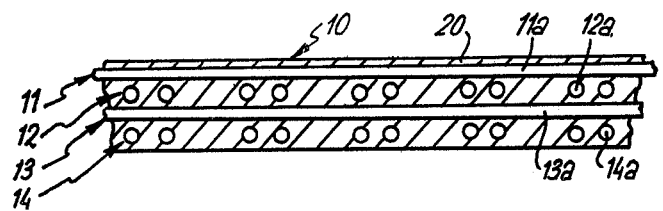
FIGS. 1 to 3 are, respectively enlarged sectional views through three forms of sheet material according to the invention.
Figure 4:
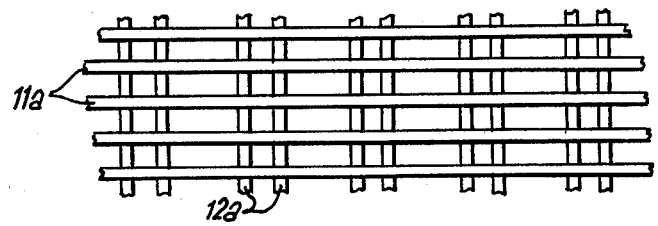
FIGS. 4 to 6 are plan views of the cross laid strands forming the multi-ply arrangements used in the construction respectively of FIGS. 1 to 3.

Referring to FIGS. 1 and 4, a flat, flexible sheet 10 of non-woven material comprises four superposed layers 11, 12, 13, 14. Each layer comprises spaced strands 11a, 12a, 13a, 14a, respectively. The strands in layers 11, 13 are parallel to each other and above each other as can be seen in FIG. 4. The strands in layers 12, 14 are parallel to each other and substantially above each other and at right angles to the strands in layers 11, 13.

The strands 11a, 12a, 13a, 14a, are all of the same decitex. The strands in the different layers could be of different decitex. The strands within a given layer could be of differing decitex.

The strands in a given layer may have a uniform spacing or a non-uniform spacing, but preferably the spacing is regular. The strand spacing may be different in the different layers.

Each strand may be of spun fibres or of one or more continuous filaments or a mixture of these. Preferably the strands in a given layer are all either spun fibres or continuous filament. Preferably the strands in all the layers are all spun fibres or all continuous filament. A suitable material for the fibres or continuous filament is untwisted I.C.I. nylon type 126.

The layers are embedded in a medium 20. Suitable materials for the medium are polyvinyl chloride (which would normally include a plasticizer, a heat stabiliser, a light stabiliser and a colouring pigment); natural rubber; synthetic rubber; polyurethane and other suitable plastics materials; and adhesives. It is usually not necessary to use a special and often toxic bonding agent to increase the bond strength between a strand and the medium, which is another important advantage of the present invention.

Figure 2:
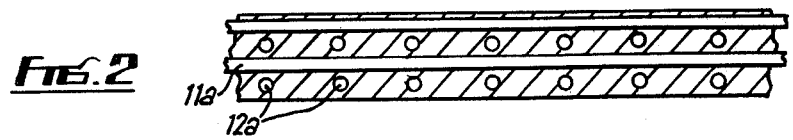
Figure 5:
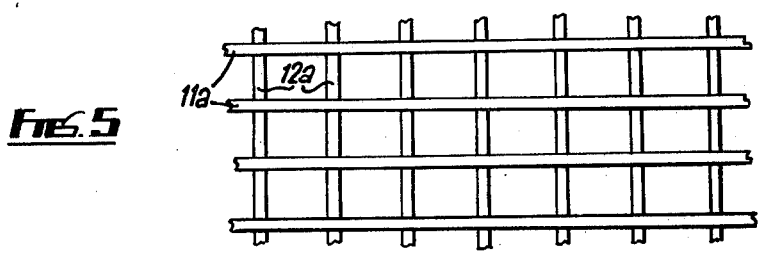

In the modification of FIG. 2, the strand spacing is uniform in each layer.

Figure 3:
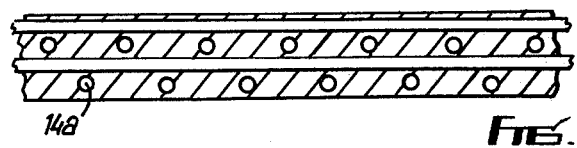
Figure 6:
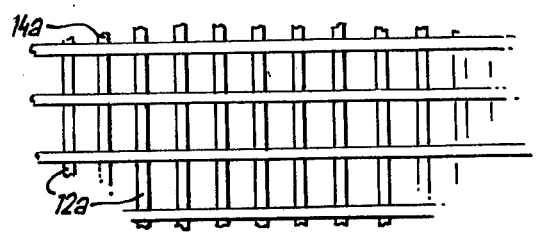

The sheet of FIG. 3 is similar to that of FIG. 2 except that the strands 14a are offset from the strands 12a.

Figure 7:
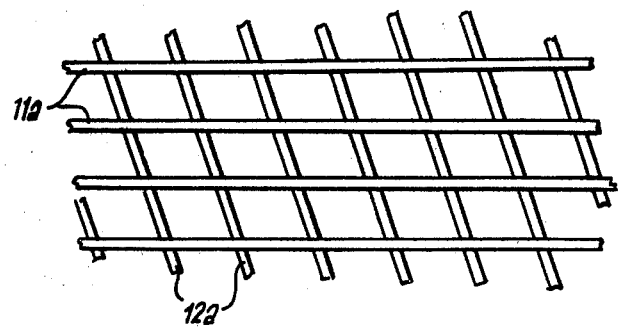
FIG. 7 is a plan view of a further cross-laid ply.

The strands in layer 11 need not be parallel to the strands in layer 13; the strands in layer 12 need not be parallel to the strands in layer 14. The strands in layers 11, 13 need not be at right angles to the strands in layers 12, 14 but they are transverse to such strands—FIG. 7 shows an example.

Figure 8:
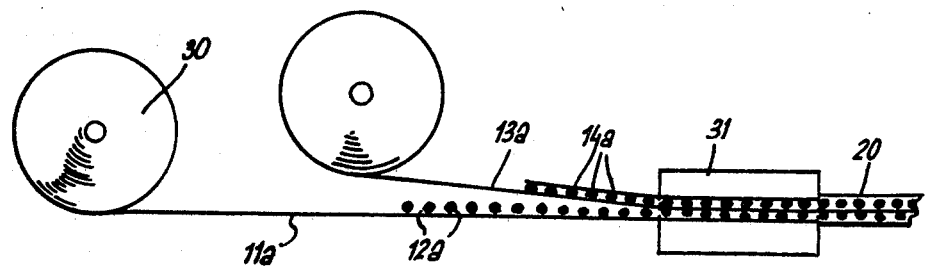
FIG. 8 shows one form of apparatus for making such sheet material.

The material can be made in the manner illustrated in FIG. 8. A sheet of strands 11a given coherence by the application thereto of p.v.c. in a tacky, incompletely fused state, is fed forward intermittently from a roll 30 thereof. In timed relationship to the movement of the sheet of strands 11a, cut-off lengths of a similar sheet of strands 12a are cross-laid successively and side-by-side on the sheet of strands 11a and "spot-welded" in position by a hot probe to produce a two-ply cross-laid structure. A suitable machine for carrying out this process is described in my German Offenlegungsschrift No. 2826377. The two-ply material is fed beneath a similar two-ply material formed from sheets of strands 13a, 14a and the resulting four-ply material is subjected to a knife-coating operation in the zone 31 so that it is coated with p.v.c. 20. Thereafter the material is heated while being supported, fully to fuse the p.v.c. In the case of products for some end uses the knife coating operation may be omitted.

The four-ply material, which is quite flexible, may, for example, be used as a tarpaulin and we have found, as stated earlier, that, surprisingly, the material has considerably greater tear resistance and burst strength than known tarpaulin material of the type described hereinbefore and having two layers of strands woven together and supported in a p.v.c. medium. Also, abrasion which causes porosity in such known tarpaulin material does not cause porosity in the tarpaulin according to the invention. The following example gives some comparative details.

|  | Known tarpaulin having a woven base fabric | Four layer material according to the invention |
|---|---|---|
| Thickness (cm) | 0.056 | 0.053 |
| Weight (gm/sq.m) | 650 | 500 |
| Tongue-tear test (50 mm) Warp (kg) | 68 | 73.5 |
| Tongue-tear test (50 mm) weft (Kg) | 54 | 73.5 |
| Hydrostatic Head test (cm Water) (not abraded) | 150+ | 150+ |
| Hydrostatic Heat test (cm water) (abraded one side) | 2 | 150+ |
| Hydrostatic Heat test (cm water) (abraded both sides) | 0 | 150+ |

The tongue-tear tests and the hydrostatic heat tests were carried out according to BS No. 3424 of 1973.

With regard to the tongue-tear test results it should be pointed out that the figures given are the loads as tearing begins. In the case of the known tarpaulin, tearing continues at a much-reduced load, whereas in the four-ply material according to the invention increasing load is necessary to continue a "tear" and in practice the "tear" is soon arrested.

In each of the two sheets the total cross-section or decitex of the yarns in the sheet was the same so that the tensile strengths of the sheets were substantially equal. The four-ply material had 3.15 ends per cm in each layer, each end or strand being of 950 decitex.

A more exhaustive and extensive series of tests was conducted to compare the properties of p.v.c. coated fabric according to the invention and a conventional tarpaulin fabric. Both fabrics were tested to BS 3408: 1977 "Specification for Tarpaulins".

The following notes explain the various tests made and readings taken.

1. Mass per unit area

Specimens of known area were cut using a template and weighed.

2. Coating mass per unit area

The p.v.c. coating was removed quantitatively with changes of T.H.F. at room temperature and finally filtered and washed with T.H.F.

3. Breaking Strength

The tests were made on an Instron with an initial jaw separation of 200 mm and 50 mm/min rate of traverse. Five specimens were cut from the sample of the invention and five longitudinal and five cross specimens from the conventional fabric all with an effective width of 50 mm.

4. Tear Strength

The tests were made on an Instron with an initial jaw separation of 100 mm and 100 mm/min rate of traverse. Five specimens were tested from the sample of the invention and five longitudinal and five cross from the conventional fabric all 200 mm by 150. mm.

5. Flex Cracking

Five specimens from each fabric were mounted on the cylinders of the Schildknecht Flex Tester and flexed for 500,000 cycles. The specimens were assessed for deterioration in appearance and cracking.

5(a) Cold Crack Temperature

This was carried out by the Manchester Chamber of Commerce Testing House according to BS 3424: 1973 Method 10 where the maximum temperature requirement is $-20°$ C.

6. Blocking

Two strips of material 150×75 mm were placed face to face loaded uniformly over half their area with a 1.5 kg weight and placed in an oven at 60° C. for 15 minutes. On removal from the oven the weight was removed and the specimens allowed to cool for ten minutes. A 100 g weight piece was hooked to the free end of the lower strip and the free end of the upper strip raised at a uniform rate of 26 mm/s.

7. Dimensional Stability

A specimen was cut 600 mm×600 mm and marked with three pairs of datum marks. The specimen was allowed to reach equilibrium with the laboratory atmosphere and the distance between each set of datum marks was measured. The specimen was then placed in a tray under a head of 25 mm of water between 15° C. and 21° C. for two hours. On removal the specimen was allowed to dry and recondition before the distance between each pair of datum marks was re-measured.

8. Hydrostatic head Test

Tests were made on the flexed specimens and also on abraded specimens to BS 2823 but taking end point as first growing drop.

| Table of Results | | |
|---|---|---|
| | Known tarpaulin having a p.v.c. coated woven base fabric | Four layer material according to the invention |
| 1. Mass/unit area (gms/m$^2$) | 550 | 515 |
| 2. Coating Mass | | |
| Wt. of yarn (g/m$^2$) | 187 (34%) | 123 (23.8%) |
| Wt. of p.v.c. coating (g/m$^2$) | 363 (66%) | 392 (76.2%) |
| Total (g/m$^2$) | 550 | 515 |
| 3. Breaking Load (N/50 mm) | | |
| *Longitudinal | 1572 | 2187 |
| Cross | 2120 | |
| Extension % | | |
| Longitudinal | 13.1 | 20.8 |
| Cross | 24.1 | |
| 4. Tear Strength (N) | | |
| across longitudinal direction | 169.5 | 758,804(B) 879(D) |
| across cross direction | 517.8 | |
| 5. Bursting Strength | | |
| | lbf per square inch | lbf per square inch |
| | 505 | 750 |
| | 500 | 765 |
| | 515 | 765 |
| | 475 | 745 |
| | 490 | 745 |
| mean | 497 | 754 |
| 6. Flex Cracking | | |
| Deterioration in appearance | | |
| (i) | Moderate | Severe |
| (ii) | | Moderate |
| Cracking | | |
| (i) | Cracking through to base fabric | Severe cracking with threads 'lifting'. |
| (ii) | | Cracking much less severe than (i) |
| 6(a) Cold Crack Temperature °C. | — | −36, −48 |
| 7. Blocking | — | Separation without damage or lifting of weight. |
| 8. Dimensional Stability | | |
| Shrinkage % | — | 0.1 |
| | | 0.2 |
| 9. Hydrostatic Head | | |
| Fabric state | | Hydrostatic Head (cm) |
| Known tarpaulin, as received | | >150 |
| | | >150 |
| | | >150 |
| | | >150 |
| Known tarpaulin, after 500,000 flexes | | 0 |
| | | 22 |
| | | >150 |
| | | 0 |
| | | 17 |
| Four layer inventive material, after 5000,000 flexes | | 55 |
| | | 0 |
| | | 47 |
| | | >150 |
| | | 0 |
| Known tarpaulin, after abrasion one side | | >150 |
| Known tarpaulin, after abrasion both sides | | 0 |
| Four layer inventive, material after abrasion both sides | | >150 |

*As there is no definite longitudinal or cross direction in the material of the invention only one direction was tested.

As the above results show there is a significant improvement in tear strength, that most important property as far as tarpaulins and equivalent materials are concerned in the material of the invention over the conventional material. Not only that, whereas in the conventional material resistance to tearing either remains the same or actually decreases as the tear progresses, in the material of the invention resistance to tearing tends to increase as the tear progresses. In contrast thereto, in the material of the invention, the individual strands lying transversely to the tear bunch together before the tear front and the further the tear progresses the more transverse trands oppose the tear. It is also important to note that this advantage is achieved with less weight of yarn. Significantly improved tear resistance is also shown as compared with a two layer fabric mentioned in the introduction to this specification, again for fabrics of substantially the same yarn content. The invention may thus be regarded, as compared with such a two layer fabric, as securing the above described advantages by effectively rearranging the yarn strands of the original fabric into three or more layers.

It will be appreciated that the invention is not limited to sheet material of three or four plies or layers of strands but includes sheets with five, six or more plies or layers each transverse to the adjacent layer of layers.

It will be appreciated that in the case of a sheet with three superposed layers, the strands in the outer layers being parallel and the strands in the middle layer being at right angles thereto, the improved tear strength is in the direction of the strands of the outer layers.

What is claimed is:

1. A sheet material comprising a first layer having a plurality of aligned spaced apart strands disposed in and completely surrounded by a mass of an adhesive, a second layer having a plurality of aligned spaced apart strands disposed in and completely surrounded by a mass of an adhesive, superposed on the first layer with its strands lying transverse to the strands of the first layer and a third layer having a plurality of aligned spaced apart strands disposed in and completely surrounded by a mass of an adhesive with its strands disposed transversely to the strands in the second layer, wherein said strand is of spun fibers, one or more continuous filaments or a mixture thereof, the superposition being such that the overall length of each strand remains substantially unchanged, whereby to produce, for a given weight per unit area of material, a material of greater tear strength in at least one direction than a synthetic plastics material coated textile material woven from strands of the same material.

2. A sheet material as claimed in claim 1, in which the aligned strands in one or more of the layers are substantially parallel along their length.

3. A sheet material as claimed in claim 1, in which the strands in each layer are disposed at right angles to the strands in the or each adjacent layer.

4. A sheet material as claimed in claim 1, in which the adhesive is a curable synthetic plastics material.

5. A sheet material as claimed in claim 4, in which the synthetic plastics material is polyvinyl chloride.

6. A sheet material as claimed in claim 4, in which the synthetic plastics material is polyurethane.

7. A sheet material as claimed in claim 4, in which the synthetic plastics material includes a plasticiser or a heat stabiliser or a light stabiliser or a colouring pigment or any multiple combination thereof.

8. A sheet material as claimed in claim 1, in which the adhesive is rubber.

9. A sheet material as claimed in claim 1, in which the strands in two non-adjacent layers run in substantially the same direction and the strands in one of the layers are aligned with respective strands in the other layer.

10. A sheet material as claimed in claim 1, in which the strands in two non-adjacent layers run in substantially the same direction and the strands in one layer are offset in relation to the strands in the other layer.

11. A sheet material as claimed in claim 1, in which the strands in each layer are uniformly spaced.

12. A sheet material as claimed in claim 1, in which the strands in each layer are non uniformly spaced.

13. A sheet material as claimed in claim 1, in which the strands are all of the same decitex.

14. A sheet material as claimed in claim 1, in which the strands in any one layer are all of the same decitex.

15. A sheet material as claimed in claim 1, in which the strands in any one layer are of differing decitex.

* * * * *